(12) United States Patent
Casabona et al.

(10) Patent No.: US 7,336,745 B2
(45) Date of Patent: Feb. 26, 2008

(54) METHODS AND APPARATUS TO PROVIDE COMMUNICATION PROTECTION TECHNOLOGY FOR SATELLITE EARTHSTATIONS

(75) Inventors: Mario M. Casabona, Cedar Grove, NJ (US); Murray W. Rosen, Parsippany, NJ (US); Paul H. Paulson, III, West Milford, NJ (US)

(73) Assignee: Honeywell International Inc., Morristown, NJ (US)

( * ) Notice: Subject to any disclaimer, the term of this patent is extended or adjusted under 35 U.S.C. 154(b) by 1 day.

(21) Appl. No.: 11/471,961

(22) Filed: Jun. 21, 2006

(65) Prior Publication Data

US 2007/0098121 A1    May 3, 2007

Related U.S. Application Data

(63) Continuation of application No. 10/234,434, filed on Sep. 3, 2002, now abandoned.

(51) Int. Cl.
*H03D 1/04* (2006.01)
(52) U.S. Cl. .................... 375/346; 455/278.1
(58) Field of Classification Search ............... 375/346, 375/225; 331/10; 455/278.1
See application file for complete search history.

(56) References Cited

U.S. PATENT DOCUMENTS

| | | | |
|---|---|---|---|
| 4,893,350 A * | 1/1990 | Minamisono et al. ..... | 455/278.1 |
| 5,125,108 A | 6/1992 | Talwar | |
| 5,302,918 A | 4/1994 | Sturzebecher et al. | |
| 5,428,831 A | 6/1995 | Monzello et al. | |
| 5,548,838 A | 8/1996 | Talwar et al. | |
| 5,694,416 A | 12/1997 | Johnson | |
| 5,712,641 A | 1/1998 | Casabona et al. | |

(Continued)

FOREIGN PATENT DOCUMENTS

EP    1274181    7/2002

OTHER PUBLICATIONS

Erie, "ASI-2100 Adjacent Satellite Interference Suppression", Sep. 24, 2001, Publisher: ERI Electronics, Inc.

(Continued)

*Primary Examiner*—Chieh M. Fan
*Assistant Examiner*—Jaison Joseph
(74) *Attorney, Agent, or Firm*—Fogg & Powers LLC

(57) ABSTRACT

An interference signal canceling system for communications protection is described for canceling interference signals from earth station received signals using a two input adaptive cancellation network. The present invention addresses terrestrial, co-channel and adjacent satellite interference sources resulting from emitting, isolated, frequency re-use and polarized sources. Main and auxiliary signals are derived directly or by coherent conversion to intermediate frequency using an auxiliary antenna, cross-polarized feed, or auxiliary squinted feed. Filters set receive and canceling bands. Cancellation combines the main signal with a phase, amplitude and time modulated sample of the auxiliary signal. A receiver correlates the auxiliary signal with a sample of the combined output to minimize interference. A control drives the modulator from internal measurements, or satellite receiver measurements, i.e., BER, C/No, SNR, etc., or both. The control searches the modulation space to locate interference nulls followed by null acquisition and tracking to maximize cancellation effects. The present invention is also configurable for multiple interferences using series and parallel arrangements.

19 Claims, 5 Drawing Sheets

U.S. PATENT DOCUMENTS

| | | | |
|---|---|---|---|
| 5,818,517 A * | 10/1998 | Hudson et al. | 348/21 |
| 5,822,429 A | 10/1998 | Casabona et al. | |
| 5,872,540 A | 2/1999 | Casabona et al. | |
| 6,028,893 A | 2/2000 | Schreib | |
| 6,388,610 B1 | 5/2002 | Przyjemski et al. | |
| 6,476,685 B1 | 11/2002 | Cheung | |
| 6,590,528 B1 | 7/2003 | DeWulf | |
| 6,861,983 B2 | 3/2005 | Casabona et al. | |

OTHER PUBLICATIONS

Erie, "ERI, an Electro-Magnetic Interference Mitigation Technology Developer for the Defense, Navigation and Communication INDU", Apr. 20, 2001, Publilsher: Electro-Radiation Inc.

Erie, "ERI Electronics, Inc.'s Communication Protection Utilizing EMC3 Technology Keeps Your System Interference Free", Oct. 4, 2001, Publisher: ERI Electronics, Inc.

Erie, "Frequently Asked Questions ERI Electronics (Erie) 2100 Series of Automatic, Adaptive Satellite Interference Suppression", Apr. 22, 2003, Publisher: ERI Electronics, Inc.

Erie, "Product Description Template (Modify)", Jan. 1, 2002, Publisher: ERI Electronics, Inc.

Erie, "TI-2100 Terrestrial Interference Suppression", Dec. 6, 2001, Publisher: ERI Electronics, Inc.

Erie, "XPI-2100 Cross Polarization Interference Suppression", Sep. 24, 2001, Publisher: ERI Electronics, Inc.

Anaren Microwave, Inc., "Application Information and Technical Data, RF Frequency Conversion", "Anaren Microwave Components", 1984, pp. 139, 157-159, vol. 17, No. B.

Anaren Microwave, Inc., "RF Control and Switching", "Anaren Microwave Components", 1984, pp. 175, 189-192, vol. 17, No. C.

Ender, "Experimental Results Achieved With the Airborne Multi-Channel SAR System AER-II", "European Conference on Synthetic Aperture Radar", May 1998, pp. 315-318.

Microwave Filter Company, Inc., "Microwave Filter Company Please Cancellation Filters", , Publisher: www.microwavefilter.com.

* cited by examiner

METHODS AND APPARATUS TO PROVIDE COMMUNICATION PROTECTION TECHNOLOGY FOR SATELLITE EARTHSTATIONS

CROSS REFERENCE TO RELATED APPLICATIONS

This application is a continuation of U.S. application Ser. No. 10/234,434, filed Sep. 3, 2002, now abandoned entitled "METHODS AND APPARATUS TO PROVIDE COMMUNICATION PROTECTION TECHNOLOGY FOR SATELLITE EARTHSTATIONS", and which is incorporated herein by reference.

DESCRIPTION OF THE INVENTION

1. Field of the Invention

Interference in satellite down links arises from several sources: terrestrial telecommunication sources; cross-polarization sources from channel frequency reuse; and adjacent satellite sources. These interference sources can occur independently or in combination to limit the performance of L-Band, C-Band and Ku-band satellite downlinks in many locations. The present invention relates to an adaptive signal canceling system and a system and method that can be configured for the cancellation of one or more interference signals to permit a communication satellite down link signal lying in the same band or channel(s) to be received and processed. The procedure exploits the ability to resolve each source of interference using an auxiliary sense antenna or auxiliary feed separate from the earth station main or primary antenna feed, coherently correlate this (these) sample(s) with the interference component of the received signal, and adaptively suppress the interference in an intermediate band going to the satellite receiver.

The typical satellite earth station down link operates in L-Band, C-Band or Ku-Band with interference entering into the main satellite receiver at the antenna. The typical extended C-Band transponder down link operates in the 3,400 to 4,200 MHz (or the conventional C-Band being 3,700 to 4,200 MHz), and the down link is generally converted to an intermediate frequency at 70 MHz, 140 MHz or block conversion to L-Band 950-1,750 MHz (or 950-1,450 MHz) at the antenna using a low noise amplifier and block converter (LNB) for local distribution from the antenna to the receiver at the earth station. Interference to C-band satellite downlink reception commonly arising from several sources including terrestrial interference, cross-polarized channel interference, and interfering signals from adjacent satellites enters the process at the antenna via main lobe, side lobe or back lobe coupling, or via anomalies in the satellite or earth station antenna or feed. In essence, the received input signal can contain both the interference signal(s) and the desired communication signal in the same frequency band or channel, where these signals can share common modulation properties and bandwidths, and can have an arbitrary relative amplitude relation that impacts the signal processing capability of the receiver.

The need exists for a canceling system that permits a satellite communication signal to be received and processed in the presence of interference from one or more sources in the same band or channel. Such a canceling system is applied by the present invention to the down link signal processing for satellite earth stations. It is the object of the invention to provide a signal canceling system for suppressing interference from a received input signal, and to be configurable in multiple channels of operation to cancel multiple interferences from a received input signal in the same channel or in different channels. The object of the invention is to use a sample of the interference derived via an auxiliary antenna or feed to produce a canceling signal from the source of interference that is combined with the received signal to suppress the interference signal in the output. The object of the invention is to adaptively cancel the interference using measurement techniques that correlate the auxiliary interference signal with the level of interference in the output signal, and/or correlate the auxiliary interference signal with a measurement of signal processing performance in the victim satellite receiver. The object of the invention for multiple instances of interference is to provide cumulative cancellation of one or more interference sources using separate auxiliary signals and separate cancellation channels configured in series and/or parallel arrangements.

SUMMARY OF THE INVENTION

One object of the present invention is to provide an interference suppression system for satellite down link communication which exploits the common mode aspects of man-made interference observed via two paths to cancel in band interference present on the main receive signal and available on an auxiliary signal. The forms of satellite receive interference addressed by the invention include terrestrial interference, cross-polarization or co-channel interference from frequency re-use, and adjacent satellite interference. The present invention cancels both narrowband and wideband interference signals and noise.

It is a further object of the present invention to provide an antenna and signal preprocessing system that coherently processes main and auxiliary received signals to adaptively cancel common in band components.

Another object of the present invention is to receive the interference signal using one port of an adaptive microwave network and to sample the interference signal so as to modulate the combined interference signals and satellite signal and to null out the interference signal in the one port to the satellite receiver.

Still further, a general objective of the present invention is to coherently detect and modulate the (high-level) interference signal in a correlating receiver in the canceling system without the need to directly process the satellite signal.

Another general objective of the present invention is to use the processing capability of the satellite receiver of interest to provide a monitor of the impact of (low-level) interference and effects on portions of the recovered/processed signal band of interest, under favorable signal-to-noise situations, to optimize the quality of the received signal.

Yet another general objective of the present invention is to adaptively cancel interference without incurring significant losses or changes to the main signal.

Another general objective of the present invention is to partition the main and auxiliary antenna circuitry such that the adaptive cancellation system may be located near the satellite receiver and coherent band conversions may be remotely located and powered.

Another general objective of the present invention is to use multiple implementations of the adaptive cancellation configuration and system modularity to address multiple instances of independent interference in a channel or band, or in adjacent or non-adjacent channels or bands. The object being to use serial and/or parallel implementations of the invention with proper filters and control to independently address interference sources.

According to these and other objects of the present invention, there is provided sets of coherently operated receive channels that provide main and auxiliary signals that allow for adaptive cancellation of interference signals common to main and auxiliary cannels. The main and auxiliary signals are filtered, amplified, and transmitted from antenna conversion to the adaptive cancellation system using separate cables. The main signal is essentially controlled in delay with little variation in amplitude and phase, except to amplify the signal. The auxiliary signal is controlled in relative amplitude, phase and delay, and combined with the main signal to cancel common interference signals. Cancellation is accomplished by combining the auxiliary signal with the main signal in approximately equal delay, equal amplitude and 1800 relative phase with regard to the common interference signal. Control of the replica of the auxiliary signal in amplitude and phase used in this process is derived from the coherent detection of the interference at the output of the process, or input to the satellite receiver, using the auxiliary signal as the reference or local oscillator. A control circuit minimizes the relative delay between main and auxiliary signals, and sets the gain of the auxiliary channels to match the relative amplitude ranges of the channels. The control circuit sets the modulated auxiliary signal using a search of the modulator phase and amplitude control space to locate interference nulls in the monitored signal. The control implements acquisition and tracking of the detected null to optimize suppression of the interference using an energy minimization technique, satellite receiver performance optimization criteria, or a combination of the two techniques. Under a no interference condition, the adaptive cancellation system reduces the contribution of the auxiliary channel in the combined output by attenuation or switching. The present invention also addresses multiple interference sources and multiple channels of operation by linking a cascade or series arrangement of the invention, and/or a cascode or parallel arrangement to suppress multiple, independent, channel interference signals.

DESCRIPTION OF THE PREFERRED EMBODIMENTS

The interference cancellation system of the invention operates directly at RF or at an intermediate frequency (IF) developed by coherent frequency translation or conversion at the antenna to facilitate signal distribution to the earth station satellite receiver. The cancellation system can act on a band or on a channel in a band as determined by filters in the system. The system can be implemented directly at RF or at IF using analog modulation techniques or digital signal processing (DSP).

Figure 1:
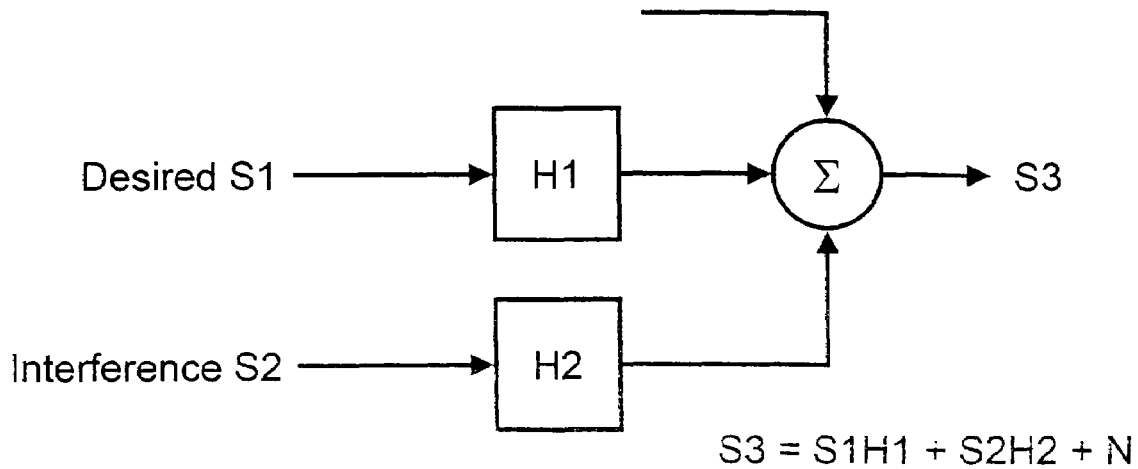
FIG. 1 is a simplified model of the interference environment showing how the desired receive signal is summed with interference and noise.

Interference encountered by satellite earth stations results from terrestrial sources, cross-polarization or co-channel interference, or adjacent satellites. The model in FIG. 1 characterizes the interference phenomenon showing the summation of the desired signal, interference signal and noise. Terrestrial interference can result from microwave communications sources operating in or near satellite downlink bands or channels and generally within direct line-of-sight. Multipath and reflections can result in strong interference. Interference combines with the downlink signal entering the system directly at RF in the skirts of the main lobe, side lobe or back lobe of the main antenna, or via coupling into the LNA, LNB conversion blocks, or transmission lines. Interference sources can be stationary or moving, with levels substantially higher than the satellite signal.

Co-channel interference can result from frequency re-use of the alternate polarization of the channel. Interference can result from poor isolation or misalignment between polarizations at the satellite, earth station antenna, or because of satellite viewing orientation and sharp angles close to the east/west horizons. Co-channel interference levels may be equivalent to the satellite signal of interest. Adjacent satellite interference occurs when closely spaced satellites with common channels drop into view of the earth station antenna due to broad main lobe beamwidth, poor pointing between satellites or high adjacent radiated signal levels. Adjacent satellite signal levels can match or exceed the desired signal. Co-channel and adjacent channel interference may vary dynamically with channel programming.

Figure 2:
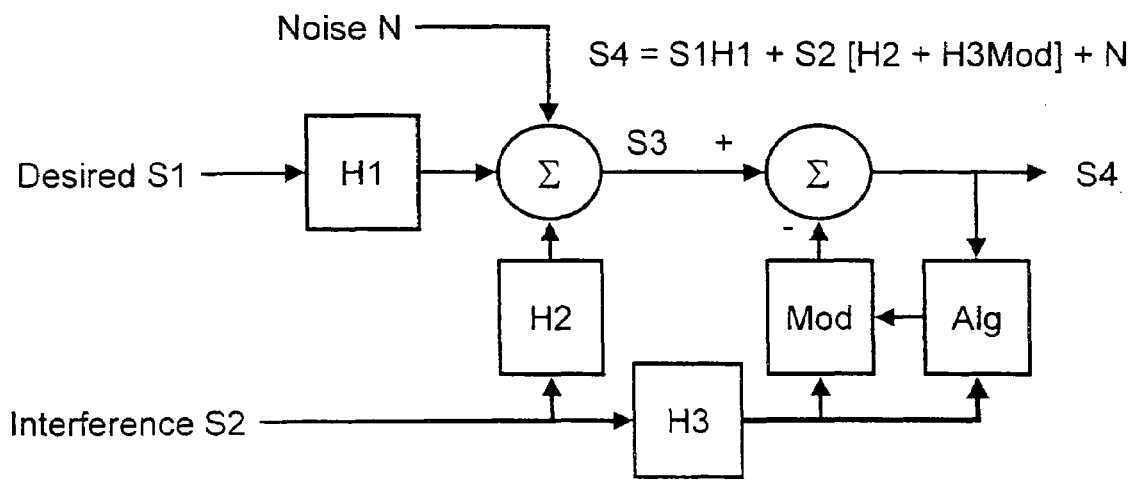
FIG. 2 is a simplified model of the communications protection system processing solution to cancel interference by modulating a sample of the interference signal to be equivalent in amplitude and 180.degree. out of phase, and summing the signal with the received signal so only the desired signal remains.

Getting a sample of the interference signal using an auxiliary antenna, feed or a reference source and combining the signals adaptively to null the interference can accomplish cancellation of these forms of interference. The model in FIG. 2 illustrates the adaptive cancellation process of the present invention using a detection and suppression algorithm, a sample of the interference signal, and modulating the sample and combining it with the received signal to cancel the interference component in the received signal.

Theoretical cancellation or suppression in a wide bandwidth adaptive cancellation system is limited by the degree of mismatch and control between main and auxiliary channels. Cancellation ratio (CR) is an established metric used to specify how well two channels in an adaptive cancellation system are matched. The following describes the system requirements to meet a desired objective CR. Ultimately CR may be bounded by signal-to-noise factors. In general, cancellation performance must address amplitude, phase, frequency and time matching error sources and control resolutions. The following equation characterizes the CR in dB as a function of these errors and resolutions:

$$CR(dB) \cong 10 \text{ Log } (1+\alpha^2-2\alpha \cos (2\pi fT+\phi))$$

where, signal amplitude error ratio, $\alpha$, is defined for $\alpha>1$, phase error, $\phi$, is defined for differential phase relative to anti-phase (i.e., 180° or $\phi$), $f$, is defined as the frequency offset or one-half the bandwidth, and time/delay mismatch, T, is defined as the difference or error in apparent group delay between the signals at the frequency offset.

Figure 3:
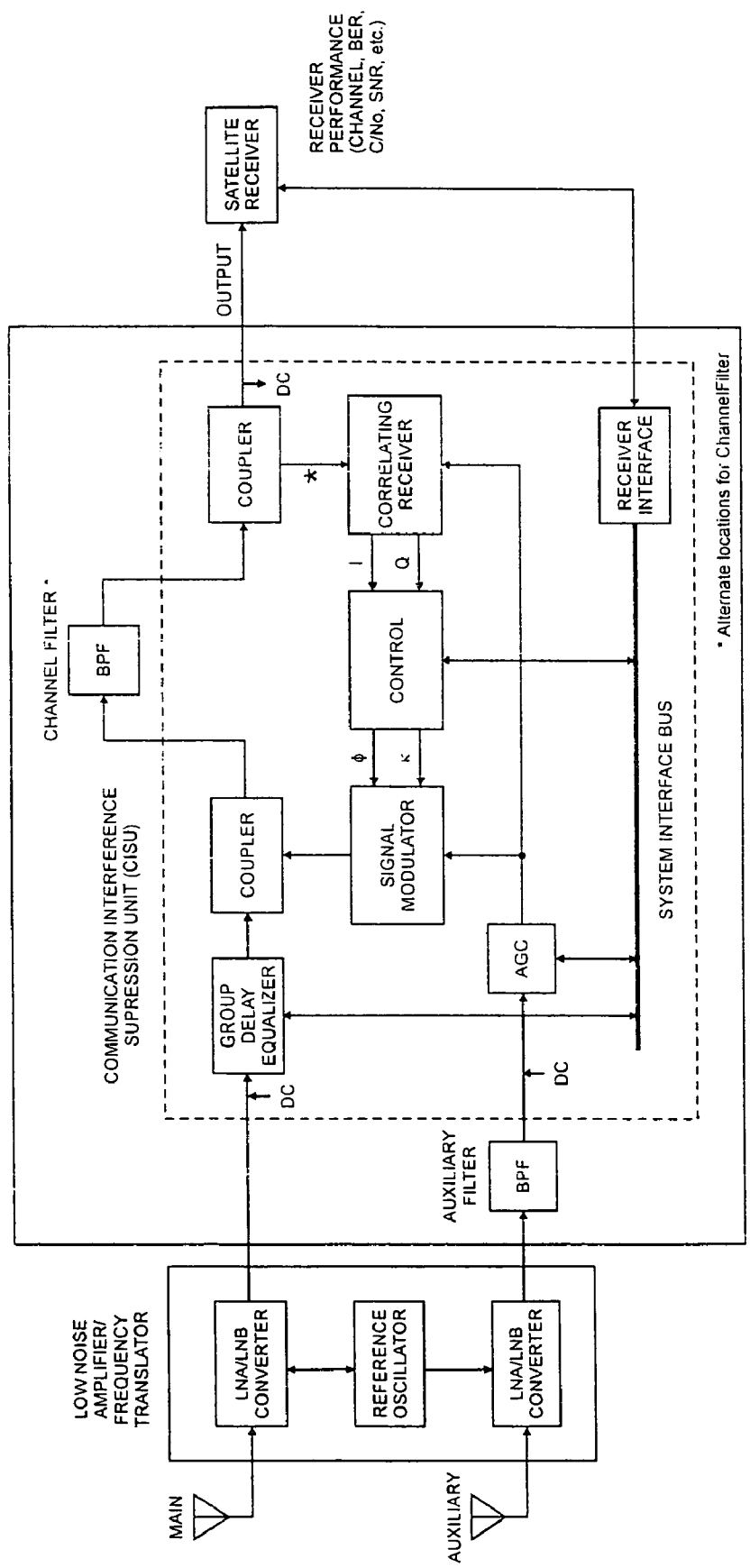
FIG. 3 is a high-level block diagram of the implementation of the communications protection system showing a main and auxiliary channel coherent frequency translation to an intermediate frequency for the communication interference suppression unit (CISU) embodiment and interface with a satellite receiver.

FIG. 3 is a block diagram of the implementation of a single cancellation channel of the communications protection system. The diagram shows a main and auxiliary channel coherently translated to an intermediate frequency for the Communication Interference Suppression Unit (CISU) embodiment shown, and interface to the satellite receiver. The intermediate frequency interface facilitates the physical separation of antenna, interference preprocessing and satellite receiver locations and the use of coaxial transmission lines. The auxiliary signal is generally the output of a secondary feed or antenna, or a reference signal. For the case of terrestrial interference, an antenna directed at the terrestrial source can provide the auxiliary signal. Such an antenna can provide a degree of spatial discrimination and gain. Care must be taken in the placement and selection of auxiliary antenna properties to match the interference source while discriminating against other interference signals in the antenna beam. The auxiliary path can provide a way for interference to enter the system. If the source of interference were moving, the auxiliary antenna would broader in beam to cover the expected field of view of the interference. When the terrestrial source is collocated with or near the earth station, a hard reference signal line may be available. The system would equalize or compensate for the transmission line delay. For the case of co-channel interference, a cross-polarized antenna feed of the main antenna can provide the auxiliary signal. For the case of adjacent satellite interference, a squinted auxiliary feed for the main antenna can provide the auxiliary signal. The squinted feed polarization may have to be optimized to provide the best reference signal for cancellation.

As shown in FIG. 3, the main and auxiliary antenna outputs or feed signals are coherently converted to the operating intermediate frequency of the cancellation system. The main signal path is composed of the desired signal and interference signal. The auxiliary signal path is composed of the interference signal with the common interference signal dominant. Both paths are essentially linear and operated in small signal mode. In most cases, the waveguide interface between the conversion and antenna feed provides a degree of signal filtering. Additional filtering can be placed in this path to increase out-of-band rejection and to attenuate out-of-band signals. A low noise amplifier (LNA) is generally used to define the front-end noise figure of the system for each signal with sufficient gain to overcome losses in later stages of processing and cables. RF conversion to IF is generally accomplished in low noise block converters (LNB). Coherent conversion can be accomplished by several means: providing a reference local oscillator signal from a common source for injection into the main conversion path and to all auxiliary conversion paths; phase locking or injection locking the local oscillator of the auxiliary conversion path(s) to the local oscillator of the main conversion path; providing a common reference clock signal (e.g., 10 MHz) from a common source to all conversion paths using a separate phase lock loop (PLL) local oscillator circuit for each conversion path; etc. The main signal and auxiliary signal are provided to the CISU at RF or at IF. The main signal path includes a programmable delay equalizer to balance the group delay between the two signal paths. Delay equalization maximizes the cancellation bandwidth of the process for broadband interference. The interference suppression algorithm includes a procedure to optimize delay mismatch and to set amplitude and phase for interference suppression.

The main signal is received through the antenna main lobe and interference enters the satellite receiver through the satellite antenna main lobe, side lobe, or back lobe. An auxiliary antenna or feed senses the common interference signal at a different amplitude and phase. The two signal paths are sampled and combined using the coupler arrangement shown in FIG. 3 and subsequently processed by a correlating receiver. The combined signal at the first summing coupler output consists of the desired signal and the interference accompanying the signal, and a modulated replica of the interference signal in the auxiliary input. The auxiliary input signal is filtered using an auxiliary band pass filter (BPF) to define the interference signal spectrum and to attenuate signals outside the band or channel. A DC bias tee may be used in the auxiliary input path to provide remote de power via the coaxial cable to the auxiliary LNA/LNB and reference oscillator. A DC continuity path is also be provided through the main signal path to route any DC bias from the satellite receiver to the main LNA/LNB.

The level of the auxiliary input sense signal can vary widely between terrestrial, co-channel and adjacent satellite interference conditions. Automatic Gain Control (AGC) is used to set the dynamic range of the auxiliary signal path and match the signal levels of interference on the two signals to the gain and dynamic range of the signal modulator. The auxiliary signal is divided and modulated for cancellation, and used as the interference reference local oscillator for the correlating receiver. The relative amplitude and phase of the interference signal in the auxiliary signal cancellation path are applied using amplitude (.kappa.) and phase (.phi.) modulation controls as shown. Signal modulation can be implemented in several ways: vector modulator using bi-phase modulators, PIN modulators, varactor phase shifters, etc. The arrangement provides adaptive adjustment of the amplitude (gain/attenuation) and the phase of the interference signal to generate a canceling signal that is equal in level and opposite in phase with respect to the interference in the main path. Proper adjustment of amplitude and phase results in recovery of the desired communication signal with common interference suppressed.

The restored output signal is sampled in the second coupler for the correlating receiver. The restored signal path is filtered using a main filter to define the signal band or channel of interest. The main filter can be placed between the couplers to define the main channel, or in the arm of the coupler to the correlating receiver to define the interference band. The correlating receiver produces a measure of the interference residual in the restored signal path using the sample of the output signal to the satellite receiver and mixing it with the amplified interference sense signal in the auxiliary path acting as the local oscillator.

Quadrature mixing and complex processing in the receiver supports correlation and adaptive control of amplitude and relative phase sense. The quadrature mixing outputs indicate the phase and amplitude difference of the two interference signals entering the correlation since the two frequencies are the same. Filtering these outputs with a low-pass filter insures that only signals that are close in frequency produce an error output. The two error signals are the in-phase (I) and quadrature-phase (Q) components of the correlation of the microwave signals over a time period equal to the inverse bandwidth of the filter. If the two signals do not correlate, then both error signals are zero. That is, the interfering signal has been successfully cancelled at the receiver. The two error signals I and Q drive the attenuator and phase shifter controls of the signal modulator in a null seeking mode to insure a null at the receiver.

To generate control signals for adaptive cancellation and control the attenuation and phase shift in the modulator, we obtain the measure of interference remaining in the restored signal path and develop proportional controls. The control function digitally encodes the error signal from the correlating receiver and develops the error magnitude and sense. This error signal is processed to generate analog/digital controls to the modulators, delay equalizer and AGC functions. The control shown consists of analog-to-digital conversion (ADC) of the error signal, system processing in a microprocessor to produce control signals, and digital-to-analog conversion (DAC) of the control signals to drive analog RF modulators. Digital look-up and calibration tables may be used to linearize the analog components over temperature and frequency.

The control function implements the control and cancellation algorithms for interference detection, auxiliary signal AGC, main signal delay control, and for interference suppression search, acquisition and track. Interference detection identifies interference conditions by measuring the interference level at the receiver interface against defined thresholds. Gain control sets the dynamic range of the auxiliary path to establish the proper level for correlation and cancellation. The search algorithm coarsely scans the control space of the signal modulator to rapidly determine candidate nulling regions in the control space as measured in the correlating receiver. The search of modulator control space covers over a full cycle of phase and the equivalent in amplitude using a coarse resolution sparse search or linear stepped routine to locate drops in post-cancellation interference. An alternate modulator control space can use I/Q control.

The acquisition algorithm selects the best null candidate and maximizes the interference null using a variable resolution control of the modulator control space based on the post-cancellation error signal. The variable resolution controls include changes to modulator step size, stepping rate, etc. The track algorithm maintains the maximum interference null. By adjusting the amplitude and phase of the added auxiliary signal, we can arrange that it cancel or suppress the interfering signal in the receive channel. Since the relative amplitude and phase of the interfering signal may vary due to relative motion, vibration, frequency changes, fading, environmental factors, multipath, etc., the system continuously adjusts the phase, amplitude and relative delay of the canceling signal to maintain the nulled condition at the receiver.

The control function operates automatically and includes a system interface bus and receiver interface that allows control to monitor the performance of the external satellite receiver for complementary control capability. The control can examine receiver performance parameters, i.e., Bit Error Rate (BER), Carrier-to-Noise ratio (C/No), Signal-to-Noise Ratio (SNR), etc. When the receiver interface is available, the control can use the CISU internal correlating receiver to suppress the interference level to the satellite receiver, then use the satellite receiver performance measure to further optimize operation. When using the internal correlating receiver, the control tracks the gradient of the measured correlated interference level in a down hill manner to the noise sensitivity of the CISU system in the processing bandwidth. When using the external satellite receiver performance measure, the control tracks the gradient of the appropriate detection parameter, i.e., to minimize BER, maximize C/No, maximize SNR, etc. This secondary tracking capability can improve suppression performance of the cancellation system below the noise sensitivity of the CISU system.

An alternate implementation of the modulation and control processing can use software radio concepts and Digital Signal Processing (DSP) techniques whereby the main and auxiliary signals from the LNA/LNB converters are filtered, coherently down converted to a convenient IF for digital processing, encoded to digital format by ADCs, and digitally down converted (DDC) to a base band or zero IF, decimated and filtered for complex processing, or processed as real signals. Group delay equalization can be performed using digital delay and/or digitally controlled analog delay techniques. Conversion and filtering can match the satellite receiver channel or band constraints for processing. The control and interference cancellation algorithms are implemented in digital processing, and the digital output of can be provided to the satellite receiver. Processing may utilize a variety of technologies including: microprocessor, DSP, FPGA (Field Programmable Gate Arrays), CPLD (Complex Programmable Logic Devices), ASIC (Application Specific Integrated Circuit) devices, etc. Cancellation and control are implemented numerically. An analog IF output can be generated by digital up conversion (DUC), filtering, DAC, and up conversion to the satellite receiver interface frequency.

Several configurations of the present invention can be implemented to suppress instances of multiple interference sources when they occur as separable interferers in the same channel or band, separable interferers in separate channels or bands, and combinations of multiple separable interferers in the same and different channels or bands. These configurations can combine terrestrial, co-channel and adjacent satellite cancellation. Filter specification and placement in these combinational configurations have to address the interaction of multiple serial filters on matched group delay between the main signal and the auxiliary signals, and the channel bandwidth. Serial/parallel configurations will also impact the cumulative noise figure of the configuration as it appears to the satellite receiver and can degrade the signal-to-noise ratio and BER of channels. In addition, the implications of multiple combined paths increase the possibilities of sneak paths whereby signals and/or noise in the auxiliary paths can be added to main line signals. Coordination of multiple interferers requires the control functions of the CISU's to synchronize and harmonize operations in the collective system. For this purpose, the control functions assume a master/slave relationship, whereby the master control, whether it is one of the CISU control functions or a separate controller, assigns responsibilities to each CISU in hierarchal fashion to rank the response, reduce interaction and maximize combined effectiveness. The present invention, implemented in modular fashion, uses a common system interface bus that supports configuration detection and master/slave determination. In configurations servicing multiple satellite receivers, the present invention provides separate RF output interfaces, and separate receiver data interfaces.

Figure 4:
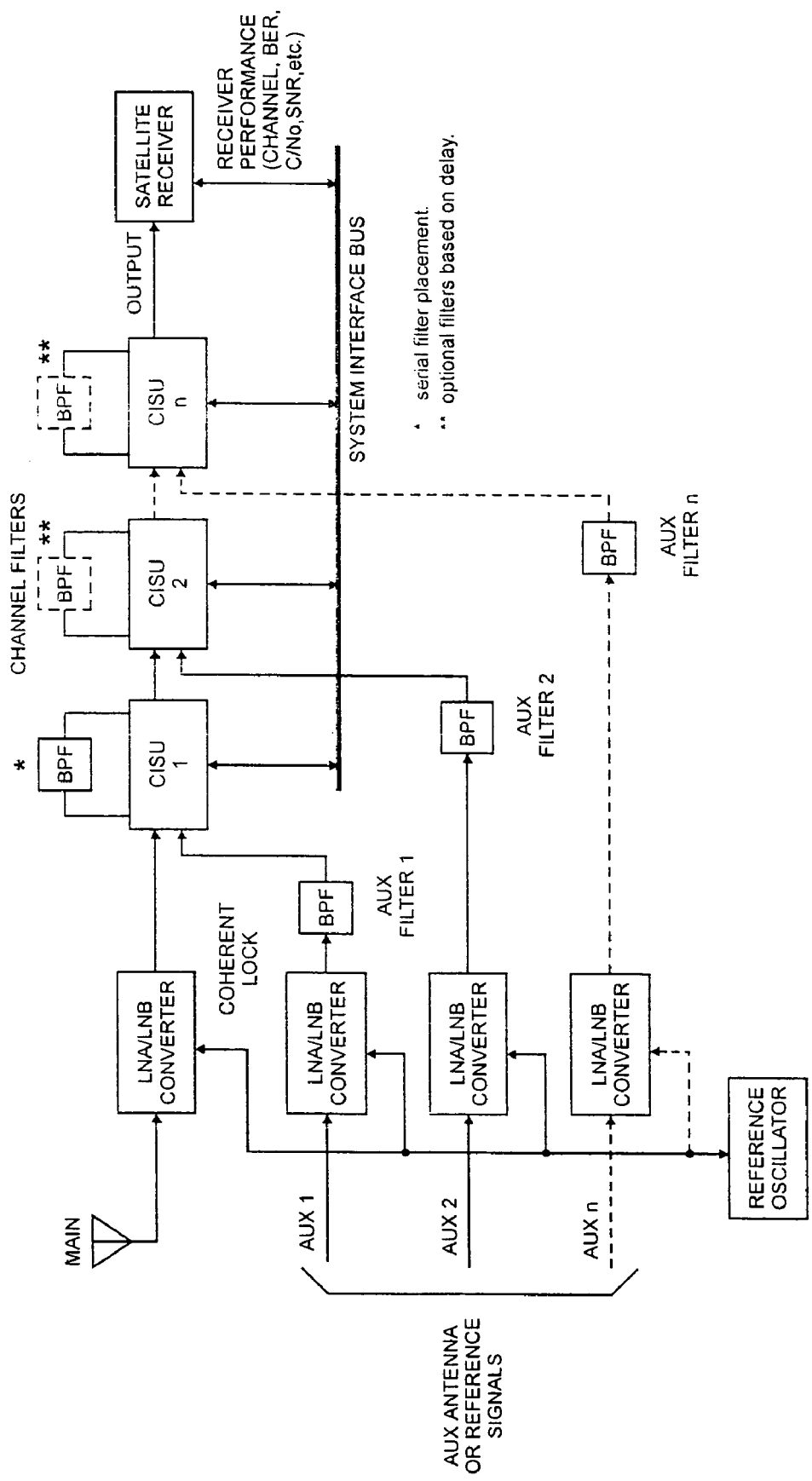
FIG. 4 is a functional block diagram of a serial embodiment of multiple interference cancellers configured to suppress multiple interferences in a common main band of interest according to the present invention.

FIG. 4 shows a block diagram of a preferred serial or cascade arrangement of the present invention when used to cancel multiple interference signals in a common channel or band. The arrangement shown places multiple instances of the CISU channel in series operation using different auxiliary feeds or reference signals. The auxiliary signals should be reasonably uncorrelated in the same channel. A common reference oscillator provides a single LO signal for all LNA/LNB converters. The serial arrangement of CISU channels uses a common main channel filter for the communication channel or band of interest. Each auxiliary path uses a band pass filter (BPF) selected to isolate the interference signal and attenuate out-of-band signals that can enter the chain. The main line filter arrangement can use a single filter in the leading CISU of the serial arrangement to define the main channel or band. Successive CISU's can delete the main filter to better match the group delay between main and auxiliary channels. Each of the auxiliary antennas or feeds is selected to suppress a different interference component with the ability to mix terrestrial, co-channel and adjacent satellite cancellation requirements in any combination, e.g., the system can cancel two or more terrestrial interferers, or cancel a terrestrial interferer and a co-channel interferer and an adjacent satellite interferer, et al. Each CISU functional block acts on the correlated interference in the main line as defined by the auxiliary reference signal. The control functions of the separate CISU's elements shown interface using a common system interface bus structure to coordinate CISU operation between elements and the external satellite receiver.

Figure 5:
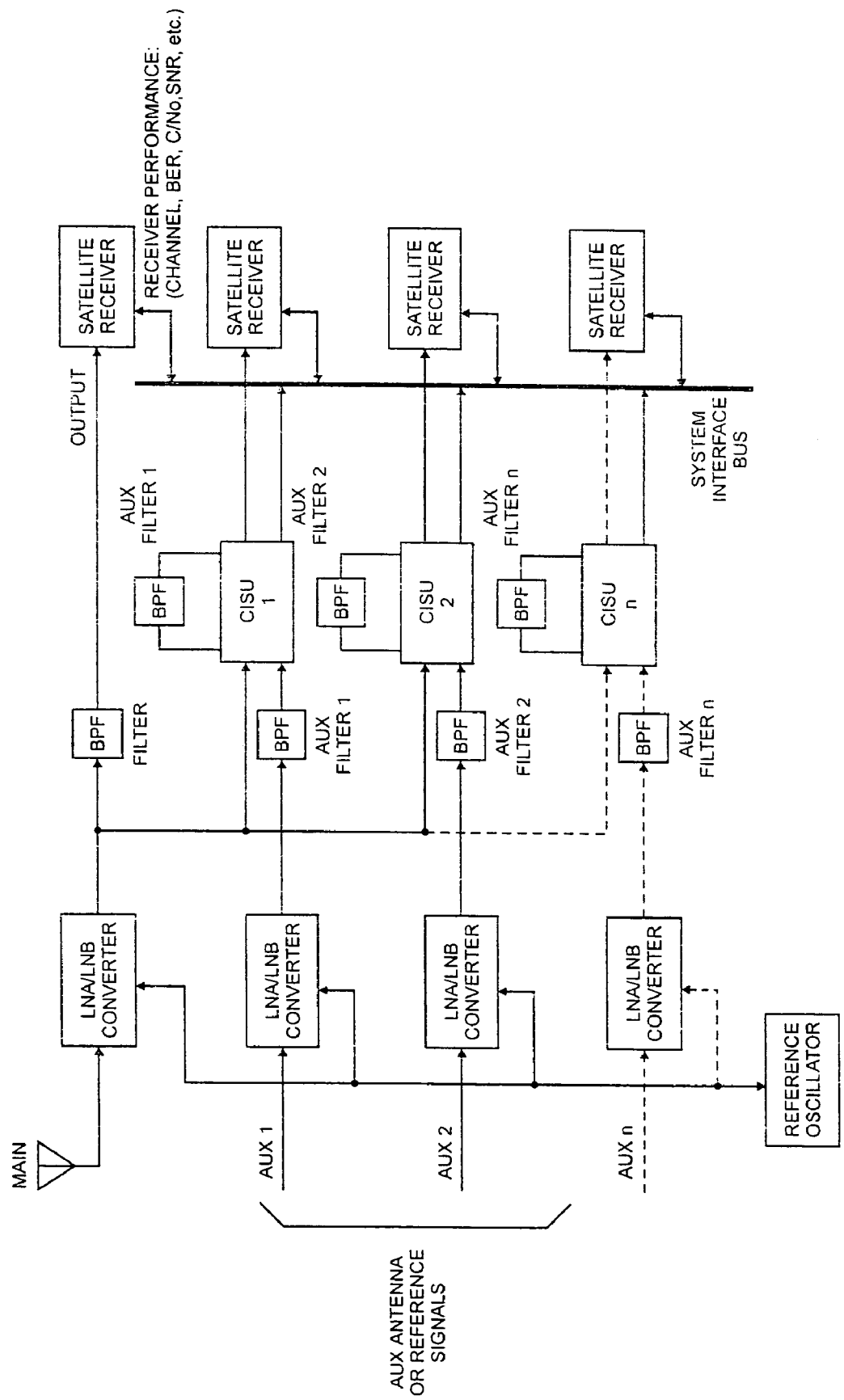
FIG. 5 is a functional block diagram of a parallel embodiment of multiple interference cancellers configured to suppress multiple interferences in separate auxiliary bands of interest according to the present invention.

FIG. 5 shows a block diagram of a preferred parallel or cascode arrangement of the present invention when used to cancel multiple interference sources in different channels or bands. The arrangement shown places multiple CISU channels in parallel operation using different auxiliary feeds or reference signals. A common reference oscillator provides the LO signal for each LNA/converter. The main antenna feed is split between the parallel channels. The parallel arrangement of CISU channels can use different main channel filters for the different communication channels and bands of interest. Each auxiliary path uses a filter selected to isolate the interference signal and attenuate out-of-band signals that may enter the chain. Each of the auxiliary antennas or feeds is selected to suppress a different interference with the capability to share the main antenna for multiple channel operation with independent interference cancellation in each channel. The types of interference cancellation implemented can be mixed and include combinations of terrestrial, co-channel or adjacent channels. A lone parallel filter channel is shown in the figure that indicates a channel that may not have an interference condition or require cancellation. All channels can be combined onto a single output to drive a single or multiple satellite receivers, or provided separately. Separate satellite receiver data interfaces would be used when separate RF outs are provided.

Figure 6:
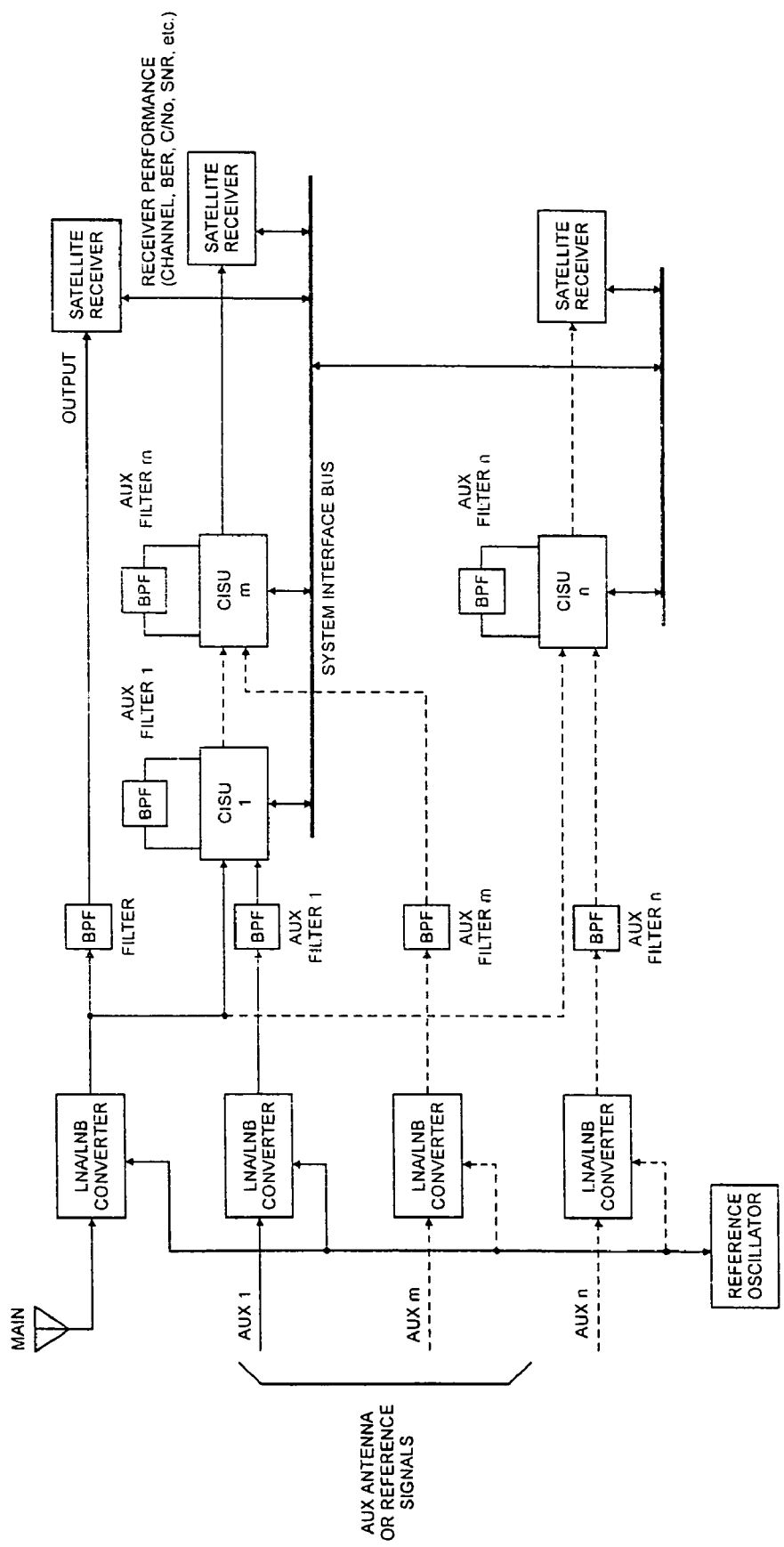
FIG. 6 is a functional block diagram of a serial/parallel embodiment of multiple interference cancellers configured to act in concert against interferences in a mixture of multiple in band and multiple separate bands of interest according to the present invention.

FIG. 6 shows a block diagram of a preferred series-parallel arrangement of the present invention when used to cancel multiple interference sources in different channels or bands where a channel may have one or more interference cancellation needs. The arrangement shown places multiple CISU channels in series-parallel configurations. The parallel channels operate over different frequency ranges as defined by main line and auxiliary filters. The serial channels operate in the same frequency range against different interference frequencies as defined by the auxiliary filters and reference signals. The arrangement can implement any combination of interference cancellation and channel needs that can be separately defined by appropriate auxiliary reference signals. As with other arrangements, a common reference oscillator provides the LO signal for the LNA/LNB converter, and the main antenna feed which is split between parallel channels. All channels can be combined onto a single output to drive a single or multiple satellite receivers, or provided separately. Separate satellite receiver data interfaces would be used when separate RF outs are provided.

We claim:

1. A communications system with interference protection, the system comprising:
    at least one main antenna operable to receive a main communication signal;
    one or more auxiliary antennas, each auxiliary antenna operable to receive an auxiliary signal containing a source of interference;
    one or more communication interference suppression units coupled to the at least one main antenna and the one or more auxiliary antennas, each suppression unit comprising:
        a signal modulator that generates a cancellation signal based on an interference level in the main and auxiliary signals;
        a summing coupler, coupled to the at least one main antenna, the summing coupler adapted to sum the cancellation signal with the main communication signal to produce a modified main communication signal;
        an automatic gain control, coupled to the signal modulator, the automatic gain control operable to match signal levels of interference in the main communication signal and interference in the auxiliary signal with gain and dynamic range levels of the signal modulator;
        a group delay equalizer, coupled to at least one of the at least one main antenna and the one or more auxiliary antennas, the group delay equalizer operable to match cumulative delays of the main communication signal and the auxiliary signal;
        a correlating receiver, coupled to receive the auxiliary signal and the modified main communication signal, the correlating receiver adapted to measure the phase and amplitude relationship of a common interference element in both the auxiliary signal and the modified main communication signal; and
        a controller, responsive to the correlating receiver, that controls the signal modulator in response to the phase and amplitude relationship measured by the correlating receiver;
    at least one system receiver that receives one or more output signals from each of the one or more communication interference suppression units;
    a receiver interface coupled to the at least one system receiver; and
    a system interface bus in communication with the receiver interface in each of the one or more communication interference suppression units, the system interface bus operable to provide performance measurements from the at least one output receiver to the one or more communication interference suppression units.

2. The system of claim 1, and further comprising one or more channel filters, each channel filter coupled to a corresponding communication interference suppression unit.

3. The system of claim 1, and further comprising a frequency converter that converts the main communication signal and the one or more auxiliary signals to an intermediate frequency.

4. The system of claim 1, wherein the one or more communication interference suppression units are connected in series, and further comprising:

a leading unit that defines a cancellation channel bandwidth; and remaining units that each define an auxiliary reference signal for interference cancellation on a single output signal.

5. The system of claim 1, wherein the one or more communication interference suppression units are connected in parallel, and further comprising:

multiple units with individual output channel bandwidths for interference cancellation on multiple output signals.

6. The system of claim 1, wherein the at least one system receiver is a satellite receiver.

7. The system of claim 1, wherein the performance measurements comprise at least one of a bit error rate, a signal-to-noise ratio, and a carrier-to-noise ratio of the at least one system receiver.

8. A communication interference suppression unit, the suppression unit comprising:

at least one main communication signal input that provides a main communication signal;

at least one auxiliary signal input that provides an auxiliary signal;

a signal modulator that generates a cancellation signal based on an interference level in the main and auxiliary signals;

a summing coupler, coupled to the at least one main antenna, the summing coupler adapted to sum the cancellation signal with the main communication signal to produce a modified main communication signal;

an automatic gain control, coupled to the signal modulator, the automatic gain control operable to match signal levels of interference in the main communication signal and interference in the auxiliary signal with gain and dynamic range levels of the signal modulator;

a group delay equalizer, coupled to at least one of the at least one main communication signal input and the at least one auxiliary signal input, the group delay equalizer operable to match cumulative delays of the main communication signal and the auxiliary signal;

a correlating receiver, coupled to receive the auxiliary signal and the modified main communication signal, the correlating receiver adapted to:

measure the phase and amplitude relationship of a common interference element in both the auxiliary signal and the modified main communication signal; and compare the phase and amplitude relationship with a reference signal to generate a correction signal; and a controller, responsive to the correction signal of the correlating receiver, that controls the signal modulator in response to the phase and amplitude relationship measured by the correlating receiver.

9. The suppression unit of claim 8, wherein the group delay equalizer is further operable to correspond within a cancellation bandwidth of the interference levels.

10. The suppression unit of claim 8, wherein the signal modulator effectively modulates the phase of the interference by 180 degrees.

11. The suppression unit of claim 8, wherein the signal modulator effectively modulates the amplitude of the interference to be equal in amplitude to the interference in the main communication signal and in the modified main communication signal.

12. The suppression unit of claim 8, wherein the correlating receiver monitors the cancellation signal and the auxiliary signal.

13. The suppression unit of claim 8, and further comprising an interface bus in communication with a satellite receiver.

14. A method for reducing interference in communication signals, the method comprising:

receiving a main communication signal;

receiving one or more auxiliary signals;

automatically matching at least one of phase, amplitude and delay of the main communication signal and the one or more auxiliary signals in a bandwidth of interest defined by one or more channel filters;

generating a cancellation signal based upon interference detected in the one or more auxiliary signals;

combining the cancellation signal with the main communication signal to cancel interference in the main communication signal;

monitoring interference levels in the main communication signal once the cancellation signal is combined with the main communication signal, wherein monitoring the interference levels further comprises:

monitoring the cancellation signal and the one or more auxiliary signals;

comparing phase and amplitude of the cancellation signal with a reference signal; and generating a correction signal in response to differences between the reference signal and the one or more auxiliary signals; and further adjusting the cancellation signal in response to the interference levels in the main communication signal.

15. The method of claim 14, wherein generating the cancellation signal further comprises:

modulating the interference to generate the cancellation signal; and adaptively adjusting at least one of phase, amplitude and delay of the cancellation signal.

16. The method of claim 15, wherein modulating the interference further comprises:

effectively modulating the phase of the interference by 180 degrees;

effectively modulating the amplitude of the interference in the one or more auxiliary signals to minimize interference in a composite output signal; and controlling a group delay of the interference that effectively modulates an interference delay in the one or more auxiliary signals to reduce interference in the composite output signal.

17. The method of claim 15, wherein adaptively adjusting the least one of phase, amplitude and delay of the cancellation signal further comprises generating a cancellation signal equal in amplitude and opposite in phase with the interference.

18. The method of claim 14, wherein combining the cancellation signal with the main communications signal further comprises substantially maximizing a cancellation bandwidth of the interference.

19. The method of claim 14, and further comprising:

indirectly monitoring output performance measurements of a system receiver;

measuring secondary interference effects and properties in the system receiver; and controlling at least one of amplitude, phase and delay of the cancellation signal to optimize overall performance of the system receiver.

* * * * *